(12) United States Patent
Wengert et al.

(10) Patent No.: US 11,143,096 B2
(45) Date of Patent: Oct. 12, 2021

(54) TURBOMACHINE, IN PARTICULAR FOR A FUEL CELL SYSTEM, FUEL CELL SYSTEM, METHOD FOR OPERATING A TURBOMACHINE, AND METHOD FOR OPERATING A FUEL CELL SYSTEM

(71) Applicant: Robert Bosch GmbH, Stuttgart (DE)

(72) Inventors: Andreas Wengert, Auenwald (DE); Tobias Reinhard Ott, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/965,037

(22) PCT Filed: Nov. 21, 2018

(86) PCT No.: PCT/EP2018/082047
§ 371 (c)(1),
(2) Date: Jul. 27, 2020

(87) PCT Pub. No.: WO2019/145065
PCT Pub. Date: Aug. 1, 2019

(65) Prior Publication Data
US 2020/0347780 A1 Nov. 5, 2020

(30) Foreign Application Priority Data
Jan. 25, 2018 (DE) .................... 10 2018 201 162.1

(51) Int. Cl.
*F02B 39/00* (2006.01)
*F01D 5/04* (2006.01)
(Continued)

(52) U.S. Cl.
CPC ............ *F02B 39/005* (2013.01); *F01D 5/046* (2013.01); *F01D 25/125* (2013.01); *F02B 37/16* (2013.01);
(Continued)

(58) Field of Classification Search
CPC ........ F02B 39/005; F02B 37/16; F02B 39/10; F02B 2039/164; F01D 5/046;
(Continued)

(56) References Cited

U.S. PATENT DOCUMENTS 5,904,471 A 5/1999 Woollenweber et al.
6,246,138 B1 6/2001 Nims
(Continued)

FOREIGN PATENT DOCUMENTS

DE 102008044876 3/2010
DE 102012221303 5/2014
(Continued)

OTHER PUBLICATIONS

International Search Report for Application No. PCT/EP2018/082047 dated Jan. 25, 2019 (English Translation, 3 pages).

*Primary Examiner* — Audrey B. Walter
*Assistant Examiner* — Edward Bushard
(74) *Attorney, Agent, or Firm* — Michael Best & Friedrich LLP

(57) ABSTRACT

Turbomachine (10), in particular for a fuel cell system (1). The turbomachine (10) comprises a compressor (11), a drive device (20) and a shaft (14). The compressor (11) has a rotor (15) arranged on the shaft (14), a compressor inlet (11a) and a compressor outlet (11b). A working fluid can be delivered from the compressor inlet (11a) to the compressor outlet (11b). A drive cooling path (92) for cooling the drive device (20) branches off at the compressor outlet (11b). Also proposed is a fuel cell system (1) with a turbomachine (10) according to the invention, a method for operating the turbomachine (10) and a method for operating the fuel cell system (1).

28 Claims, 5 Drawing Sheets

(51) Int. Cl.
| | | |
|---|---|---|
| *F01D 25/12* | (2006.01) | |
| *F02B 37/16* | (2006.01) | |
| *F02B 39/10* | (2006.01) | |
| *F02C 6/08* | (2006.01) | |
| *F04D 29/046* | (2006.01) | |
| *F04D 29/58* | (2006.01) | |
| *H01M 8/04111* | (2016.01) | |
| *H01M 8/22* | (2006.01) | |
| *H02K 5/20* | (2006.01) | |
| *H02K 9/10* | (2006.01) | |
| *F02B 39/16* | (2006.01) | |

(52) U.S. Cl.
CPC .............. *F02B 39/10* (2013.01); *F02C 6/08* (2013.01); *F04D 29/046* (2013.01); *F04D 29/5806* (2013.01); *F04D 29/5826* (2013.01); *H01M 8/04111* (2013.01); *H01M 8/222* (2013.01); *H02K 5/20* (2013.01); *H02K 9/10* (2013.01); *F02B 2039/164* (2013.01); *F05D 2220/40* (2013.01)

(58) Field of Classification Search
CPC . F01D 25/125; H01M 8/04111; H01M 8/222; H02K 5/20; H02K 9/10; F05D 2220/40; Y02E 60/50; Y02T 10/12; F02C 3/22; F02C 6/08; F04D 29/0473; F04D 17/10; F04D 29/046; F04D 29/5806; F04D 29/5826

See application file for complete search history.

(56) References Cited

U.S. PATENT DOCUMENTS

| | | |
|---|---|---|
| 2007/0172363 A1 | 7/2007 | Laboube et al. |
| 2012/0107105 A1 | 5/2012 | Korenblik |
| 2016/0032931 A1* | 2/2016 | Lee ................... F04D 25/082 |
| | | 417/368 |

FOREIGN PATENT DOCUMENTS

| | | |
|---|---|---|
| DE | 102012224052 | 6/2014 |
| DE | 102014224774 | 2/2016 |
| DE | 102015210574 | 12/2016 |
| EP | 1809875 | 8/2013 |
| EP | 3244033 | 11/2017 |

* cited by examiner

TURBOMACHINE, IN PARTICULAR FOR A FUEL CELL SYSTEM, FUEL CELL SYSTEM, METHOD FOR OPERATING A TURBOMACHINE, AND METHOD FOR OPERATING A FUEL CELL SYSTEM

BACKGROUND OF THE INVENTION

Turbomachines, which take the form of turbocompressors, for a fuel cell system are known from the prior art, for example from the document DE 10 2012 224 052 A1. The known turbocompressor has a shaft which can be driven by a drive device. A compressor and an exhaust gas turbine are arranged on the shaft.

In a detailed embodiment, a turbomachine which takes the form of a turbocompressor is known from the document DE 10 2008 044 876 A1. The known turbocompressor has an impeller, arranged on a shaft, and a compressor. The compressor here takes the form of a radial rotor, and the working fluid is delivered from the compressor inlet to the compressor outlet.

The subject of the present invention is the efficient cooling of components of the turbomachine, in particular the drive device, by means of the working fluid.

In order to be able to operate a fuel cell, for example, in a vehicle, water on the one hand, and ambient on the other hand, must be supplied. Electrically driven turbocompressors are here known from the prior art which serve to supply air to a fuel cell. A compressor impeller which delivers the required air mass flow to the fuel cell is attached to a rotating shaft which is driven by an electromotor.

SUMMARY OF THE INVENTION

The turbomachine according to the invention has optimized cooling which is used in particular for the bearing points and the drive device. The turbomachine is here preferably arranged in a fuel cell system.

For this purpose, the turbomachine comprises a compressor, a drive device, and a shaft. The compressor has an impeller arranged on the shaft, a compressor inlet, and a compressor outlet. A working fluid can be delivered from the compressor inlet to the compressor outlet and is thus preferably compressed. A drive cooling path branches off at the compressor outlet in order to cool the drive device.

By virtue of the compressed working fluid, a pressure or mass flow of the working fluid is present in the drive cooling path, by means of which forced convection from the drive device into the working fluid of the drive cooling path is achieved. By virtue of the pressurized working fluid, a flow is created inside the turbomachine in the drive cooling path. Owing to the pressure, it is not necessary for the drive cooling path to be sealed in a complex fashion and instead it can be defined by corresponding cavities, gaps, etc. The heat transfer coefficient between the drive device and the working fluid is accordingly high such that the cooling of the drive device is very efficient.

Frictional heat which is to be cooled via the drive cooling path and the working fluid which flows therein occurs in particular at the tribological points of the turbomachine such as, for example, at bearings or drive devices.

In particularly preferred embodiments, a heat exchanger is arranged in the drive cooling path upstream from the drive device. The compressed and hence also heated working fluid is thus cooled upstream from the drive device to be cooled such that the cooling of the drive device is configured more efficiently.

In advantageous embodiments, the drive device has a rotor and a stator. The rotor is here arranged on the shaft. The drive cooling path leads through a gap between the rotor and the stator. As a result, the cooling of the rotor and the stator is configured very simply. The gap is preferably a throttling point in the drive cooling path such that the flow rate of the working fluid is particularly high there, as too is the heat transfer coefficient between the drive device and the working fluid.

In advantageous developments, the shaft is mounted by means of two radial bearings, the two radial bearings being arranged in the drive cooling path. The two radial bearings are also thus cooled efficiently by the working fluid in addition to the drive device. The two radial bearings are here preferably arranged with respect to the two axial ends of the drive device.

The drive cooling path advantageously branches into a first partial path and into a second partial path. One radial bearing is arranged in the first partial path and one radial bearing in the second partial path. As a result, the flow control of the working fluid in the drive cooling path inside the turbomachine is maintained very simply and it is possible to do without complex sealing points. The drive cooling path preferably branches at the drive device into the first and second partial path.

In advantageous embodiments, the shaft is mounted by means of an axial bearing, wherein the axial bearing is arranged in the first partial path. The axial bearing here preferably comprises an axial bearing plate. The axial bearing is consequently also efficiently cooled. The axial bearing and one radial bearing are ideally arranged in the first partial path and the other radial bearing and the majority of the drive device are arranged in the second partial path. As a result, neither of the two partial paths are overloaded by the amount of heat to be absorbed.

In further preferred embodiments, the shaft is mounted by means of an axial bearing and at least one radial bearing. The drive cooling path branches into a first partial path and a second partial path. The axial bearing is arranged in the first partial path and the radial bearing in the second partial path. The two bearings are consequently cooled efficiently by different partial paths. If the turbomachine also has a second radial bearing, a further third partial path preferably branches off from the first partial path such that the second radial bearing is also cooled by an independent partial path.

In advantageous developments, a partial path valve is arranged in the first partial path, preferably downstream from the axial bearing. The mass flow of the air or of the oxidizing agent can consequently be controlled by the axial bearing. For this purpose, the partial path valve takes the form of a proportional valve. The partial path valve finally distributes the total mass flow of the air or of the oxidizing agent through the drive cooling path over the individual partial paths; the components arranged therein can thus be optimally cooled as required.

In advantageous developments, arranged opposite the rear side of the impeller is a rear wall as part of a housing of the turbomachine. Ventilation bores are formed in the rear wall. The ventilation bores are arranged in an impeller rear cooling path of the turbomachine which branches off from the compressor outlet. The impeller rear cooling path is thus, in addition to the drive cooling path, a second cooling path which branches off from the compressor outlet. As a result, leakage of the working fluid which takes place anyway can be used and dynamic pressure of the working fluid which occurs at the rear side can be prevented; on the contrary, the working fluid which flows over the rear side is used to cool in particular the axial bearing.

Accordingly, the impeller rear cooling path is preferably routed through the axial bearing. For example, the axial bearing can, for this purpose, take the form of an axial bearing plate which is arranged on the shaft and interacts with a buffer plate. The working fluid then flows into the gap between the buffer plate and the axial bearing plate. The buffer plate is here arranged on the housing of the turbomachine or a part of the housing.

In advantageous embodiments, the shaft is mounted by means of two radial bearings. The drive cooling path branches into a first partial path and into a second partial path. One radial bearing is arranged in the first partial path and one radial bearing in the second partial path. The impeller rear cooling path opens into the first partial path, preferably upstream from the axial bearing. As a result, the mass flow in the first partial path is increased, and consequently so too the cooling effect of the first partial path.

In advantageous embodiments, a cooling valve is arranged in the drive cooling path. The drive cooling path branches into two or more partial paths and then the cooling valve is preferably arranged upstream from these partial paths. As a result, the cooling valve, which is advantageously formed as a proportional valve, can control the whole mass flow of the air or the oxidizing agent for cooling the components—in particular of the drive device, the axial bearing, and the radial bearing—in the turbomachine. If it is required to cool these components, the cooling valve closes off the drive cooling path and the mass flow of the air through the drive cooling path, which represents a leakage mass flow for the volumetric efficiency of the turbomachine, is blocked. As a result, the efficiency of the turbomachine is ultimately increased.

According to an advantageous development of the invention, it is provided that a bypass duct, in particular for pressure limitation, branches off at the compressor outlet. In this way, compressor surge can be avoided and the compressor can nevertheless be operated at a high speed. In the case of a fuel cell system, a lower mass flow is, for example, supplied in the actual fuel cell than is delivered in the compressor. The difference is purged via a bypass duct. The bypass duct can be partly or completely opened in order to be able to obtain high pressure ratios with low mass flows. The compressor thus delivers a larger mass flow than is subsequently supplied.

A further advantage results from the fact that a bypass valve is arranged in the bypass duct. In this way, the mass flow through the bypass duct can be regulated or controlled such that there is no need for a permanent flow through the bypass duct and instead only at predetermined operating points of the turbomachine or when compressor surge is detected.

It is also particularly advantageous if the bypass valve is formed by the cooling valve. In this way, there is a saving of one valve. The costs and the complexity of the turbomachine are accordingly reduced. There is moreover one less component which can potentially become worn or fail over long-term use of the turbomachine, such that the potential for faults in the turbomachine is lowered. The measurement technology required in the system can additionally be reduced. There is thus no need to separately detect, using measurement technology, the mass flows in the drive cooling path and in a different bypass duct in order to be able to identify and regulate the mass flows in the individual ducts. The sensor system of a duct is not required as a result of merging the two ducts. The number of components which can fail is also consequently reduced such that this measure has the consequence of increased reliability of the turbomachine.

It is particularly advantageous if a regulation unit is provided which controls the degree of opening of the cooling valve in order to adjust an actual value of the temperature of the medium in the drive cooling path, preferably in the region of the downstream end of the drive cooling path, to a target value of the temperature. In this way, the cooling mass flow through the drive cooling path can be matched to the cooling requirement for the drive device and minimized. The cooling mass flow represents a loss of the total mass flow which is generated by the compressor and, in the case of the drive of a fuel cell system, is no longer available for the fuel cell. Because the cooling mass flow is supplied by the compressor, energy is required in order to generate it. This energy has a negative effect on the overall efficiency of the turbomachine. By virtue of the regulation described, the influence of the branching of the cooling mass flow on the overall efficiency can thus be minimized.

It is furthermore advantageous if the regulation unit controls the degree of opening of the cooling valve depending on the target value of the temperature of the medium in the drive cooling path and depending on a desired bypass mass flow. In this way, the regulation of the temperature of the cooling mass flow or the medium in the drive cooling path and the regulation of the bypass mass flow can be unified and hence the functionality of the cooling valve increased efficiently.

In advantageous developments, the impeller takes the form of a radial rotor. The working fluid can flow through the impeller on its front side, along a flow path. The flow path comprises an axial flow end and a radial flow end; the axial flow end here corresponds to the compressor inlet, and the radial flow end to the compressor outlet. Axial forces which result fluidically occur at the impeller as part of its functioning and are preferably borne by an axial bearing. The axial bearing is preferably also cooled by the drive cooling path.

In preferred developments, the partial path valve is arranged in one of the partial paths in addition to the cooling valve such that not only the total mass flow of the air or the oxidizing agent can be controlled but also the mass flow is split into the partial paths. Accordingly, the partial path valve also preferably takes the form of a proportional valve.

In advantageous uses, the turbomachine is arranged in a fuel cell system. For this purpose, the turbomachine takes the form of a turbocompressor and the impeller takes the form of a compressor. The fuel cell system has a fuel cell, an air feed line for feeding an oxidizing agent into the fuel cell, and an exhaust gas line for discharging the oxidizing agent from the fuel cell. The compressor is arranged in the air feed line. The air feed line here serves for the inflow of the working fluid or oxidizing agent into the fuel cell, and the exhaust gas line serves for the discharge from the fuel cell of the oxidizing agent or the reacted oxidizing agent or a mixture thereof. The turbocompressor is designed in accordance with one of the abovedescribed embodiments. The impeller here preferably takes the form of a radial rotor. The ambient air is preferably used as the oxidizing agent. The cooling of as many components of the turbomachine as possible by the drive cooling path increases its efficiency and lifetime.

In advantageous developments, the fuel cell system has an exhaust gas turbine with a further impeller. The further impeller is likewise arranged on the shaft. The exhaust gas turbine is arranged in the exhaust gas line. The further impeller of the exhaust gas turbine is preferably arranged with an opposite orientation to the impeller of the turbocompressor such that the active axial forces that result in each case on the two impellers are partially compensated. The reacted working fluid or oxidizing agent which flows out of the fuel cell can be used very effectively as a power source for the exhaust gas turbine; the required drive power of the drive device for the turbocompressor is consequently reduced. The exhaust gas line is thus advantageously separated from the cooling fluid path such that no heated medium is fed to the cooling fluid path.

An advantage results that the drive cooling path opens into the exhaust gas line upstream from the exhaust gas turbine. In this way, the cooling mass flow is conveyed to the exhaust gas turbine. It is consequently possible for the residual energy of the cooling mass flow to be recovered such that energy can be saved during operation of the compressor.

It is also advantageous if the drive cooling path opens into the exhaust gas line downstream from the exhaust gas turbine. In this way, a maximum pressure drop over the drive cooling path is obtained such that high mass flows over the drive cooling path are enabled which occasion the highest possible cooling effect because they transport away as quickly as possible the heat which is absorbed by the components to be cooled.

The method according to the invention for operating a turbomachine has the advantage that the degree of opening of the cooling valve is controlled by the regulation unit in order to set the predetermined target value for the temperature of the medium in the drive cooling path. In this way, it is ensured that, even when the drive cooling path and the bypass duct are combined, at least the required cooling capacity for the drive device or the components of the turbomachine is generated.

A further advantage is obtained by the method claim, depending thereon, according to which the degree of opening of the cooling valve is controlled by the regulation unit in order to set, depending on a detected compressor surge, a desired bypass mass flow in the drive cooling path which is greater than the mass flow required to set the target value for the temperature of the medium in the drive cooling path. In this way, both adequate cooling of the drive device or the components of the turbomachine and prevention of compressor surge can be ensured by the resulting cooling mass flow set in this way. It is thus ensured by activating the cooling valve according to the invention that the functioning of both the drive cooling path and the bypass duct is ensured by virtue of the drive cooling path and the bypass duct being combined in a common duct.

The method according to the invention for operating a fuel cell system with a turbomachine has the advantage that the degree of opening of the cooling valve is controlled by the regulation unit in order to set, depending on a desired operating state of the fuel cell system, a desired bypass mass flow in the drive cooling path which is greater than the mass flow required to set the target value for the temperature of the medium in the drive cooling path. In this way, both adequate cooling of the drive device or the components of the turbomachine and setting of a desired operating state of the fuel cell system can be ensured by the resulting cooling mass flow set in this way. It is thus ensured by activating the cooling valve according to the invention that the functioning of both the drive cooling path and the bypass duct is ensured by virtue of the drive cooling path and the bypass duct being combined in a common duct.

The fuel cell system can preferably be configured to drive a drive device of a motor vehicle.

BRIEF DESCRIPTION OF THE DRAWINGS

Further optional details and features of the invention emerge from the following description of preferred exemplary embodiments which are shown schematically in the drawings, in which.

DETAILED DESCRIPTION

Figure 1:
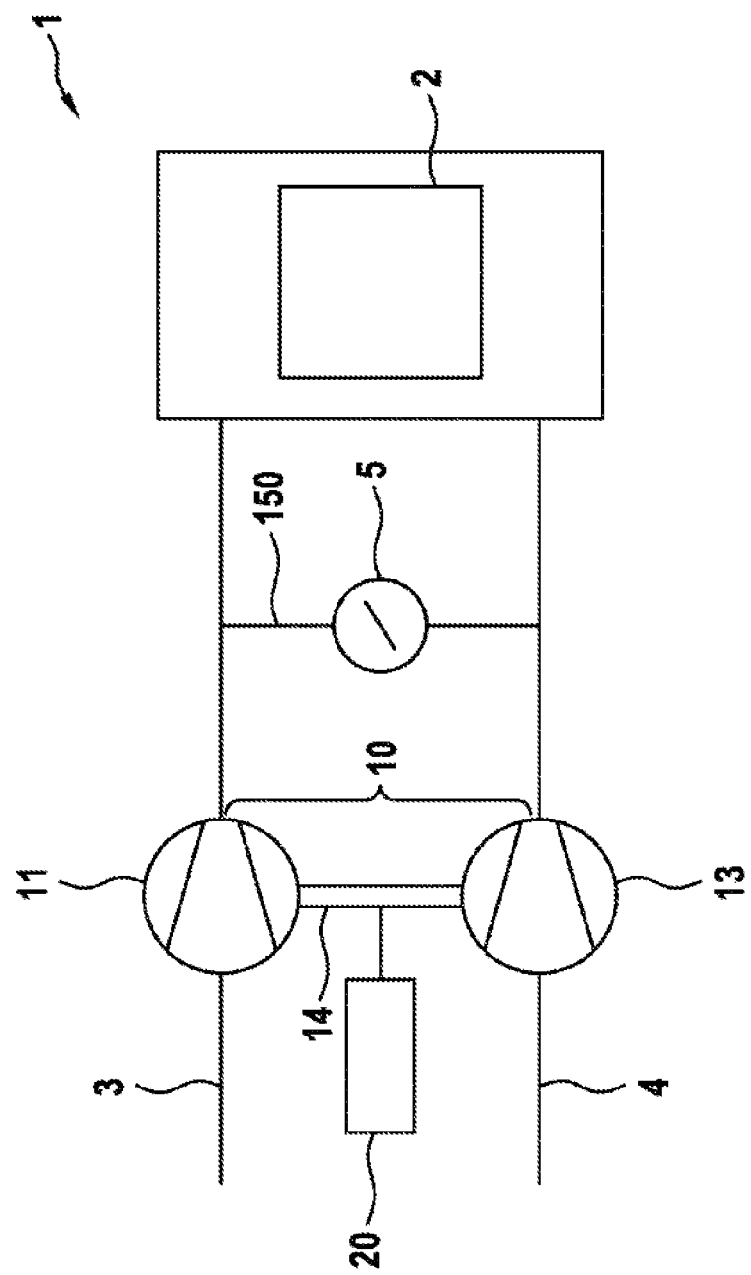
FIG. 1 shows schematically a fuel cell system with a turbomachine from the prior art which takes the form of a turbocompressor.

FIG. 1 shows a fuel cell system 1 known from DE 10 2012 224 052 A1. The fuel cell system 1 comprises a fuel cell 2, an air feed line 3, an exhaust gas line 4, a compressor 11, an exhaust gas turbine 12, a bypass duct 150 with a bypass valve 5 for pressure reduction, and a feed line (not shown in detail) for feeding fuel to the fuel cell 2. The bypass valve 5 can, for example, be a regulating flap. A wastegate valve can, for example, be used as the bypass valve 5.

The fuel cell 2 is a galvanic cell which converts the chemical reaction energy of a fuel fed via the fuel feed line (not shown) and of an oxidizing agent into electrical energy, in the embodiment shown here said oxidizing agent being intake air which is fed to the fuel cell 2 via the air feed line 3. The fuel can preferably be hydrogen or methane or methanol. Steam, or steam and carbon dioxide, is accordingly formed as the exhaust gas. The fuel cell 2 is, for example, configured to drive a drive device of a motor vehicle. For example, the electrical energy generated by the fuel cell 2 here drives an electromotor of the motor vehicle.

The compressor 11 is arranged in the air feed line 3. The exhaust gas turbine 13 is arranged in the exhaust gas line 4. The compressor 11 and the exhaust gas turbine 13 are mechanically connected via a shaft 14. The shaft 14 can be electrically driven by a drive device 20. The exhaust gas turbine 13 serves to assist the drive device 20 to drive the shaft 14 or the compressor 11. The compressor 11, the shaft 14, and the exhaust gas turbine 13 together form a turbomachine 10.

Figure 2:
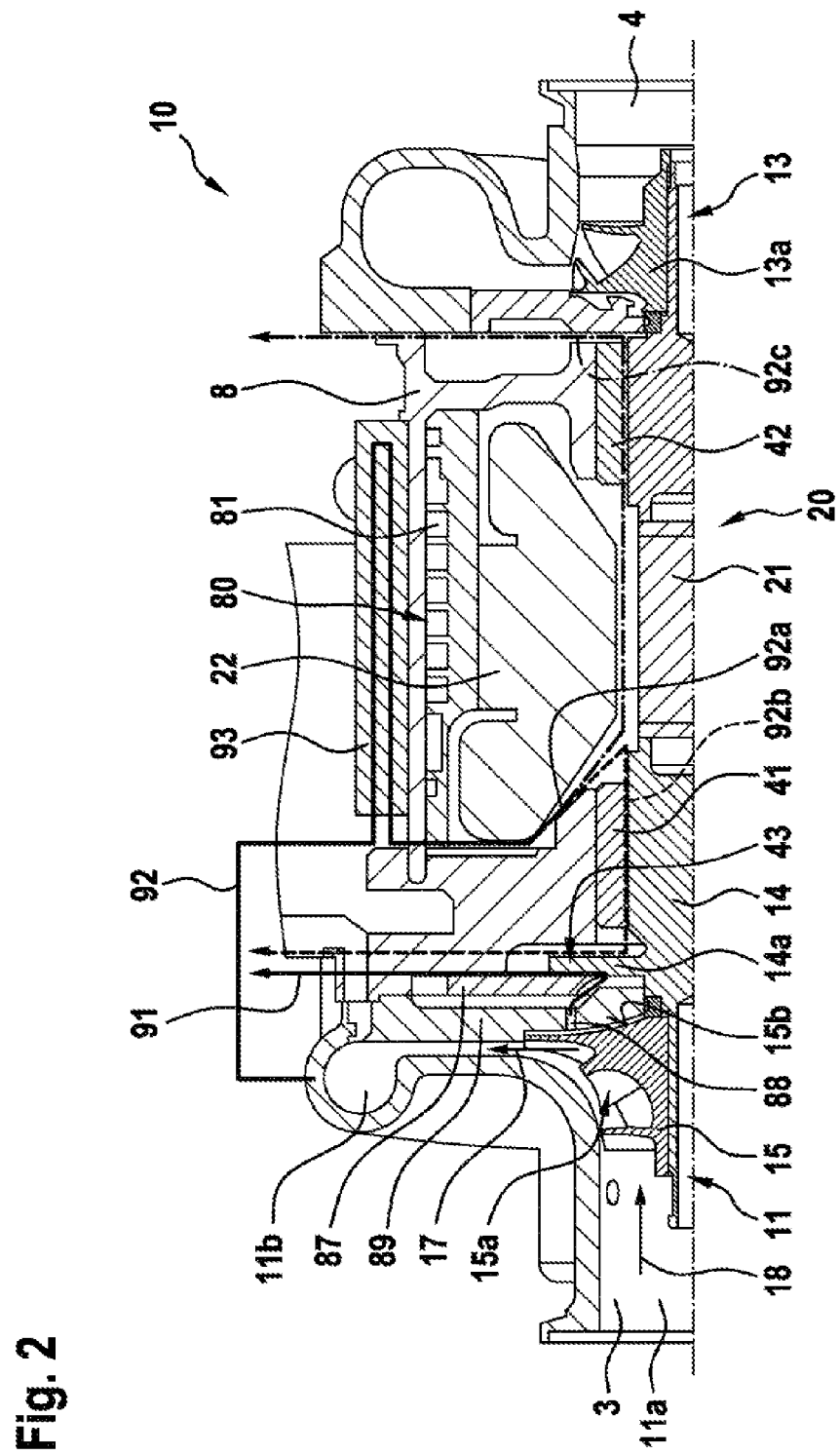
FIG. 2 shows schematically a section through a turbomachine according to the invention, wherein only the essential regions are shown.

FIG. 2 shows schematically a longitudinal section of a turbomachine 10 according to the invention, in particular for use in a fuel cell system 1. The turbomachine 10 has a housing 8 in which the components of the turbomachine 10 are arranged and which has a multi-part design. The turbomachine 10 takes the form of a turbocompressor 10 in this embodiment and has an impeller 15, arranged on the shaft 14, which acts as a compressor 11. In addition, the turbomachine 10 optionally has the exhaust gas turbine 13 which comprises a further impeller 13a arranged on the shaft 14. The further impeller 13a and the impeller 15 are here preferably positioned on the opposite ends of the shaft 14.

The turbomachine 10 is advantageously arranged in the fuel cell system 1 such that the impeller 15 of the compressor 11 is arranged in the air feed line 3 in order to supply the fuel cell 2 with ambient air or oxidizing agent, and such that the further impeller 13a of the exhaust gas turbine 13 is arranged in the exhaust gas line 4.

The drive device 20 of the turbomachine 10 takes the form of an electromotor, is arranged between the compressor 11 and the exhaust gas turbine 13, and comprises a rotor 21 and a stator 22. The rotor 21 is likewise arranged on the shaft 14. The stator 22 is positioned rigidly in the housing 8 of the turbocompressor 20. The shaft 14 is mounted rotatably on both sides of the drive device 20 by means of in each case one radial bearing 41, 42. The drive device 20 is positioned between the two radial bearings 41, 42. A cooling system 80 is arranged radially around the stator 22. In the embodiment in FIG. 2, the cooling system 80 has cooling grooves 81 formed in the housing 8 such that a coolant can flow around and effectively cool the stator 22.

The impeller 15 takes the form of a radial rotor in the embodiment in FIG. 2 and thus, in the use case as a turbocompressor or compressor 11, the flow onto it is axial and the flow away from it is radial; the oxidizing agent or working fluid thus flows from a compressor inlet 11a to a compressor outlet 11b. For this purpose, the impeller 15 has on its front side 15a a flow path which comprises an axial flow end 18 and a radial flow end 17. As is customary in the case of a radial rotor, the direction of a working fluid flowing through the impeller 15 changes by approximately 90° in the view in section. In the case of the embodiment as a turbocompressor, the working fluid flows axially onto the impeller 15 at the axial flow end 18, i.e. at the compressor inlet 11a, the working fluid then passes through the flow path 16 on the front side 15a, is compressed in so doing, and is then discharged radially from the impeller 15 at the radial flow end 17, i.e. at the compressor outlet 11b.

A rear wall 89 is arranged on the rear side 15b of the impeller 15, as part of the housing 8, opposite the rear side 15b. The rear side 15b is fluidically connected to the radial flow end 17 and, depending on any throttling points that may be present, also has the same pressure level as it. In preferred embodiments, the rear wall 89 can also form an axial bearing for the impeller 15. In the embodiment in FIG. 2, however, the axial bearing 43 is formed between an axial bearing plate 14a and a buffer plate 87. The axial bearing plate 14a is arranged on the shaft 14, and the buffer plate 87 is arranged on the housing 8 or takes the form of a constituent part of the housing.

Ventilation bores 88 which lead from the rear side 15b toward the inside of the turbomachine 10 are formed in the rear wall 89. Ventilation of the rear side 15b of the impeller 15 takes place through the ventilation bores 88 in the rear wall 89. Consequently, on the one hand, the axial force generated by the compressor 11 falls, as a result of which the loss of performance which occurs in the axial bearing 43 can be reduced. The leakage of the oxidizing agent which occurs through the ventilation bores 88 is furthermore used to cool the axial bearing 43, formed between the axial bearing plate 14a and the buffer plate 87, through which the flow passes. The cooling path from the rear side 15b through the ventilation bores 88 and through the axial bearing 43 is termed the impeller rear cooling path 91. The oxidizing agent released at the end of the impeller rear cooling path 91 is extracted from the turbomachine 10 or can also be fed back to the axial flow end 18.

At the compressor outlet 11b, a further cooling path branches off from the air feed line 3: the drive cooling path 92. For this purpose, some of the oxidizing agent or working fluid is branched off at the compressor outlet 11b in order to cool the drive device 20 and the radial bearings 41, 42 in the interior of the turbomachine 10. However, a heat exchanger 93 is preferably initially arranged in the drive cooling path 92, downstream from the compressor outlet 11b, in order to cool down the compressed and heated working fluid.

Not all of the air compressed by the compressor 11, or the compressed oxidizing agent, is therefore routed to the fuel cell 2. A small portion is removed at the compressor outlet 11b and cooled initially via the heat exchanger 93. The cooling water of the cooling system 80 which cools the stator 22 is preferably used for this purpose. The cooled air, or the cooled oxidizing agent, is then conveyed into the housing 8 between the left-hand radial bearing 41 and the stator 22. The mass flow of the drive cooling path 92 branches here at a branching point 92a into a first partial path 92b and a second partial path 92c.

After the branching point 92a, the first partial path 92b leads into the gap between the shaft 14 and the left-hand radial bearing 41, onward and past the axial bearing plate 14a, and is finally routed out of the housing 8. After the branching point 92a, the second partial path 92c leads into the gap between the rotor 21 and the stator, onward into the gap between the shaft 14 and the right-hand radial bearing 42, and is routed past the exhaust gas turbine 13 and out of the housing 8.

By virtue of the flow routed along the second partial path 92c through the gap between the rotor 21 and the stator 22 and through the radial bearing 42, there is a further advantage that leakage which occurs, possibly also in the form of moisture, is discharged from the turbomachine 10. After cooling the components, the first partial path 92b and the second partial path 92c leave the turbomachine 10 and are fed to the exhaust gas line 4, for example after the exhaust gas turbine 13.

The air which is compressed by the compressor 11 and thus heated is cooled down by the heat exchanger 93 and then fed back again into the housing 8 to the drive device 20 and the bearing points (radial bearings 41, 42 and axial bearing 43); the cooling design of the turbomachine 10 is optimized as a result. A plurality of partial paths 92b, 92c of the drive cooling path 92 are preferably provided in the turbomachine 10 in order to be able to separately cool every component (radial bearings 41, 42, axial bearing 43, gap between the rotor 21 and the stator 22). These components lie directly in the drive cooling path 92 or in the impeller rear cooling path 91, the working fluid thus flows directly onto them, and they are cooled by means of forced convection, which is very effective. The cooling system 80 based on heat transfer is thus very well assisted, in particular in the gap between the rotor 21 and the stator 22 and in the bearing points because these positions are situated relatively far away from the cooling system 80, and accordingly the heat flow from them to the cooling system 80 is fairly low.

The heat exchanger 93 is preferably formed as an air/water heat exchanger which cools the air in the drive cooling path 92 by means of the coolant of the cooling system 80.

Figure 3:
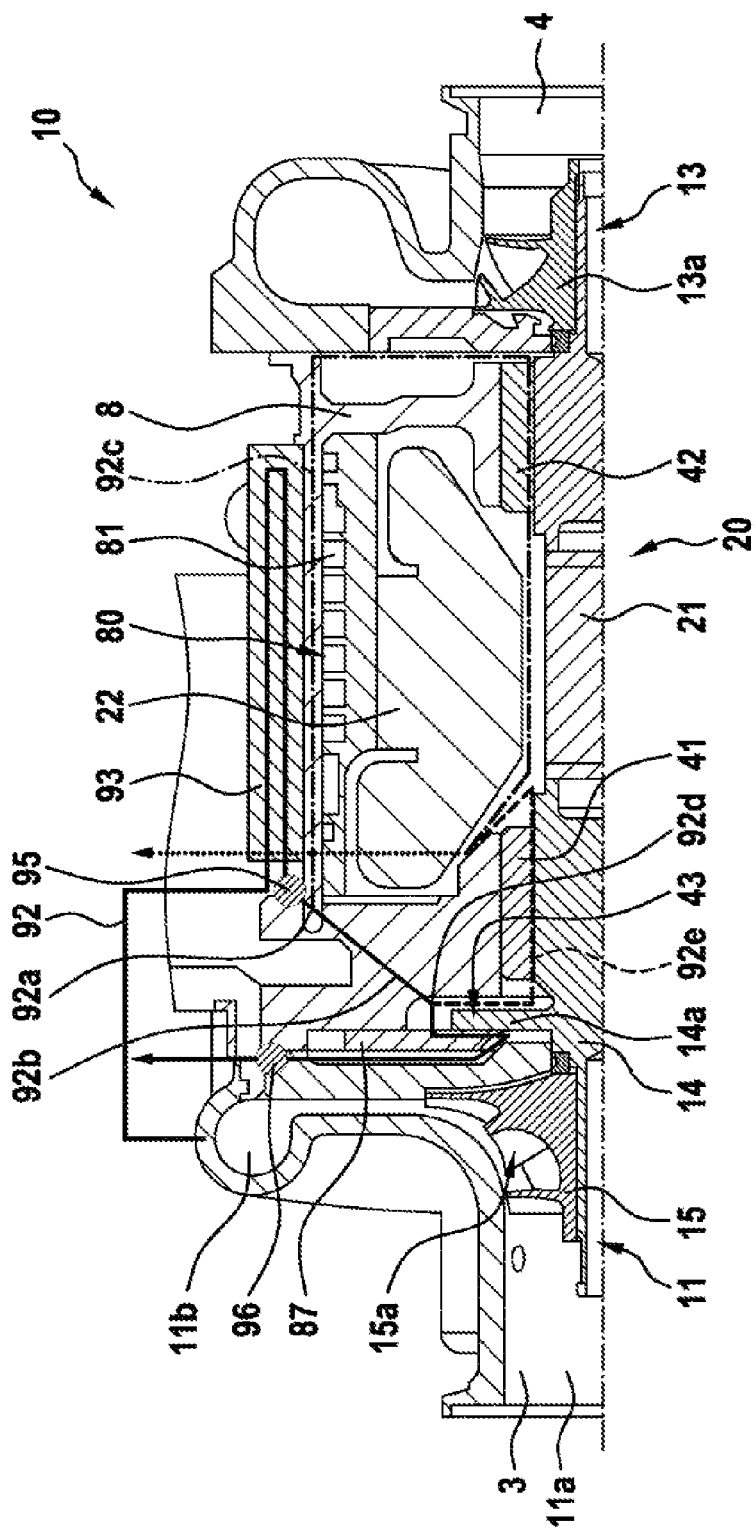
FIG. 3 shows schematically a section through a further turbomachine according to the invention, wherein only the essential regions are shown.

FIG. 3 shows a section of a turbomachine 10 which is similar to the embodiment in FIG. 2. In what follows, the focus will therefore mostly be on the differences in the two embodiments.

As in the embodiment in FIG. 2, not all of the air compressed by the compressor 11 is routed to the fuel cell 2. A small portion is removed and cooled initially via the heat exchanger 93. The cooling water of the cooling system 80 for cooling the stator 22 is preferably used for this purpose. The cooled air is then routed into the housing 8 via the drive cooling path 92 and splits there at the branching point 92a into the first partial path 92b and the second partial path 92c. A further branching point 92d, from which a third partial path 92e branches, is arranged in the first partial path 92b, downstream from the branching point 92a.

The first partial path 92b is routed, downstream from the further branching point 92d, through the axial bearing 43, and the third partial path 92e through the left-hand radial bearing 41. The second partial path 92c is routed through the right-hand radial bearing 42 and joins up with the third partial path 92e in the region of the drive device 20 so as to be routed together out of the housing 8 again. The first partial path 92b leaves the housing 8 separately. All three bearings 41, 42, 43 are thus each cooled separately from one another by an independent partial path 92b, 92c, 92e. After the partial paths 92b, 92c, 92e exit the housing 8, they can preferably be fastened to the exhaust gas line 4 downstream from the exhaust gas turbine 13.

In preferred embodiments, valves are attached in order to coordinate the mass flows in the respective partial paths 92b, 92c, 92e. They can, as required, restrict individual partial paths 92b, 92c, 92e:

A cooling valve 95 is arranged in the drive cooling path 92 upstream from the partial paths 92b, 92c, 92e.

A partial path valve 96 is arranged in the first partial path 92b downstream from the axial bearing 43.

The total mass flow of the air or the oxidizing agent through the drive cooling path 92, i.e. the sum of the mass flows through the three partial paths 92b, 92c, 92e, can be controlled by the cooling valve 95, wherein the cooling valve 95 is arranged upstream of these partial paths 92b, 92c, 92e. The partial path valve 96 in turn controls the mass flow of the air or the oxidizing agent through the partial path 92b after the further branching point 92d and is arranged downstream from the axial bearing 43. This means that, when the cooling valve 95 is open and the partial path valve 96 is closed, air or oxidizing agent flows through the two radial bearings 41, 42 but not the axial bearing 43.

The two valves 95, 96 can optionally also correspondingly be used in the embodiments according to FIG. 2 in order to control the mass flows in the drive cooling path 92 or in the partial paths 92b, 92c.

Figure 4:
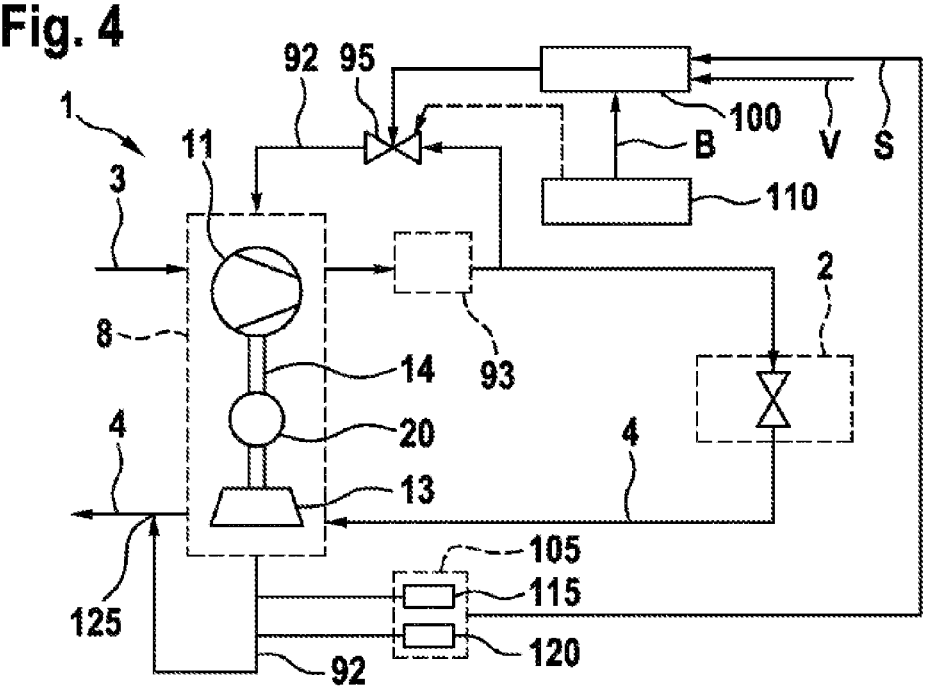
FIG. 4 shows schematically a fuel cell system with a turbomachine according to a first exemplary embodiment which takes the form of a turbocompressor.

The fuel cell system 1 with the turbomachine 10 in the form of a turbocompressor according to a first exemplary embodiment is shown schematically in FIG. 4. The same reference numerals here designate the same elements as in the abovedescribed Figures. In comparison with the fuel cell system shown in FIG. 1, there are the following differences: on the one hand, the drive cooling path 92 branches off at the outlet of the compressor 11. It can here additionally be provided, as shown in FIG. 4 and described with reference to FIG. 2, to provide initially the heat exchanger 93 for cooling the working fluid on the outlet side of the compressor 11 and to branch off the drive cooling path 92 downstream from the heat exchanger 93. Before it enters the housing 8, the drive cooling path 92 has the cooling valve 95, as can also be seen in FIG. 3. The cooling valve 95 can alternatively also be arranged inside the housing 8. After leaving the housing 8, the drive cooling path 92 opens into the exhaust gas line 4 downstream from the exhaust gas turbine 13, as also described with respect to FIG. 3.

A maximum pressure drop is consequently obtained via the drive cooling path 92 such that high mass flows are enabled via the drive cooling path 92. Because the drive cooling path 92 acts as a throttling point, a pressure drop over the drive cooling path 92 is required in order to generate the cooling mass flow. The cooling mass flow which is established in the drive cooling path 92 is here largely depending on the pressure prevailing downstream from the compressor 11. As a result, close to the surge limit, the highest cooling mass flow is established with correspondingly high pressures at the compressor outlet 11b, and close to the choke limit, the lowest cooling mass flow is established with correspondingly low pressures at the compressor outlet 11b. In order to adapt the required cooling mass flow to the operating points or operating states of the fuel cell system 1, in the simplest case the cooling valve 95 can be formed as a fixed restrictor with a predetermined fixed degree of opening which ensures sufficient cooling power for the drive device 20 or the components of the turbomachine 10 for the most frequently used operating points or operating states of the fuel cell system 1. The required cooling mass flow here depends on different factors such as the compressor speed and the compression ratio of the turbomachine 10 and the power of the drive device 20. In comparison with the required degree of opening, a higher degree of opening of the cooling valve 95 is here permanently set in order to be on the safe side with regard to the required cooling power. The turbomachine 10 is accordingly not operated with optimum efficiency.

Control or regulation of the cooling mass flow by means of a control unit 110 is therefore proposed as an alternative, in which the throttling characteristics of the drive cooling duct 92 are adapted according to the operating point or operating state B of the fuel cell system 1. In this case, the cooling valve 95 is, for example, an electromagnetic or mechanical proportional valve, formed for example as a bimetallic valve, and thus enables variable setting of its degree of opening. The throttling characteristics of the drive cooling duct 92 can be adapted to the current operating state or operating point B of the fuel cell system 1 by, for example, a map-based valve control system. A respective required cooling mass flow and, linked thereto, an associated degree of opening of the cooling valve 95 is here associated with the current operating state of the fuel cell system 1 depending on the compressor speed and compression ratio of the turbomachine 10 and on the power of the drive device 20. The cooling valve 95 is accordingly activated in order to set the desired degree of opening. In this way, the minimum cooling mass flow for the required cooling power can be set and hence the turbomachine 10 operated with optimum efficiency in every operating point or operating state of the fuel cell system.

The map has been saved in the control unit 110 and has been determined experimentally. The current operating state or operating point B of the fuel cell system 1 in the form of the compressor speed and the compression ratio of the turbomachine 10 and the performance of the drive device 20 is also available in the control unit 110 or is fed to it by a sensor system. The map-based control of the cooling valve 95 by the control unit 110 is shown by a dashed line in FIG. 4.

Alternatively, the degree of opening of the cooling valve 95 is regulated and in this regard is activated by a regulation unit 100 and hence no longer directly by the control unit 110. The cooling valve 95 can here also be formed in the manner also described with respect to the map-based control. Sensor signals S are in turn fed to the regulation unit 100 by a sensor unit 105. The fuel cell 2 in the fuel cell system 1 according to FIG. 4 is shown as a throttle valve in order to illustrate the throttling effect of the fuel cell 2 on the mass flow of the oxidizing agent or working fluid, for example in the form of intake air.

The regulation unit 100 then primarily sets the degree of opening of the cooling valve 95 such that the required cooling effect is obtained for cooling the drive device 20 or the components of the turbomachine 10 in the respective operating point or operating state B of the fuel cell system 1. For this purpose, a temperature sensor 115 which measures the temperature of the medium in the drive cooling path 92 and hence the temperature of the cooling mass flow is provided in the sensor unit 105. This temperature represents an actual value or an actual temperature which is fed to the regulation unit 100 via the sensor signals S. A target value is stored in the regulation unit 100 for the temperature of the medium in the drive cooling path 92. The regulation unit adjusts the actual value to the target value by controlling the degree of opening of the cooling valve 95. An increase in the degree of opening of the cooling valve 95 thus causes a rise in the cooling mass flow and hence a lowering of the temperature of the medium in the drive cooling duct 92. Conversely, a reduction in the degree of opening of the cooling valve 95 causes a decrease in the cooling mass flow and hence an increase in the temperature of the medium in the drive cooling duct 92. In this way, the minimum cooling mass flow for the required cooling power can be set and thus the turbomachine 10 can be operated with optimum efficiency in every operating point or operating state of the fuel cell system 1.

Advantageously and as shown in FIG. 4, the temperature of the medium in the drive cooling path 92 is measured by the temperature sensor 115 at the downstream end of the drive cooling path 92, the so-called outlet 125 of the drive cooling path 92, i.e. at a point of the drive cooling path 92 at which the cooling mass flow has already passed through the drive device 20 and the components of the turbomachine 10 to be cooled and has no further cooling function. In this way, in the described regulation of the temperature of the drive cooling path 92, all of the heat of the cooling mass flow absorbed during the cooling is recorded and consequently the whole cooling effect is taken into account. The outlet 125 is here shown schematically in FIG. 4. As described with respect to FIGS. 2 and 3, the drive cooling path 92 can be split into multiple partial paths 92b, 92c, 92d which leave the drive device 20 or the components of the turbomachine 10 at different outlets. The temperature sensor 115 then measures the temperature of the medium at one of these outlets. Alternatively, in each case one temperature sensor can also be arranged at each of the outlets in order to measure the local temperature of the medium at the respective partial path 92b, 92c, 92e. In this case, the arithmetic mean of the temperatures measured at the outlets can function as the actual value.

An experimentally determined value of the temperature at the outlet 125 or, in the case of the described partial paths 92b, 92c, 92e, at the corresponding outlets of these partial paths 92b, 92c, 92e, can be used as the target value for the temperature, also referred to as the target temperature. The experimentally determined value can here be selected as the threshold value which cannot be exceeded at the outlet 125 or at the outlets in order to ensure the operational security of the drive device 20 or the components of the turbomachine 10 and protect them from damage.

The control variable of the regulating circuit is here the throttling position or the degree of opening of the cooling valve 95. In order to ensure that the measurement point of the temperature sensor 115 at the outlet 125 of the drive cooling path 92 or, in the case of the described partial paths 92b, 92c, 92e, at the corresponding outlets of these partial paths 92b, 92c, 92e, always obtains a measurement value that is representative for the internal temperature of the turbomachine 10 and the drive device 20, a minimum cooling mass flow must always be present in the drive cooling path or in the respective partial path 92b, 92c, 92e. The cooling valve 95 is therefore prevented from closing completely by the regulation unit 100. If the cooling valve 95 has been closed completely, the turbomachine 10 or the drive device could overheat internally without the temperatures significantly changing at the outlet of the drive cooling path 92 or, in the case of the described partial paths 92b, 92c, 92e, at the corresponding outlets of these partial paths 92b, 92c, 92e.

Signals indicating the set operating state or operating point B of the fuel cell system 1 or of the vehicle driven by the fuel cell system 1 are fed to the regulation unit 100 by the control unit 110 of the fuel cell system 1. The control unit 110 can here also simultaneously be the control unit of the vehicle.

In comparison with FIG. 1, the fuel cell system 1 according to FIG. 4 does not have a separate bypass duct 110 with a separate bypass valve 5. According to the embodiment in FIG. 4, the bypass duct is formed by the drive cooling path 92. In other words, in addition to cooling the drive device 20 and the components of the turbomachine 10, the drive cooling path 92 also assumes the function of the bypass duct 110. Correspondingly, in addition to setting the target temperature of the cooling mass flow at the outlet 125 of the drive cooling path 92, the cooling valve 95 also assumes the function of setting a desired bypass mass flow. In other words, the cooling valve 95 additionally assumes the function of the bypass valve 5. The cooling mass flow thus simultaneously performs the function of the bypass mass flow.

The regulation unit 100 primarily activates the cooling valve such that the target temperature at the outlet 125 of the drive cooling path 92 which is required to cool the drive device 20 and the components of the turbomachine 10 is set as far as possible. In other words, at least the cooling function of the drive cooling path 92 is to be ensured.

The regulation unit 100 additionally determines whether the compressor 11 has moved to surge mode, so called compressor surge, with the aid of further fed sensor signals V. This can cause the destruction of the compressor 11 and hence the failure of the fuel cell system 1 and therefore needs to be prevented. The compressor surge can here be detected in a manner known to a person skilled in the art, for example as described in DE 10 2012 224 052 A1. Operation of the fuel cell 2 at high pressures close to the surge limit beyond which compressor surge occurs is advantageous and enables operation of the compressor 11 with high efficiency. It is even more important for the compressor surge to be detected and prevented during the operation of the fuel cell system 1. The aim is thus to operate the fuel cell 2 at high pressures and small mass flows of the working fluid. This can be ensured by the bypass function of the drive cooling path 92.

If therefore compressor surge is detected by the regulation unit 100 with the aid of the received sensor signals V, the cooling valve 95 is activated by the regulation unit 100 for the purpose of setting a degree of opening in order to set a desired bypass mass flow for preventing the compressor surge. For this purpose, the actual value of the cooling mass flow at the outlet 125 is recorded at the outlet 125 of the drive cooling path 92 by means of a mass flow measurement apparatus 120, in the present case for example an air mass meter. According to the present example, the mass flow measurement apparatus 120 is also part of the sensor unit 105. The actual value of the cooling mass flow is then also communicated to the regulation unit 100 via the sensor signals S. However, the mass flow measurement apparatus 120 can also be arranged separately from the sensor unit 105, for example at the upstream end of the drive cooling path 92 in order to measure the actual value of the cooling mass flow before it enters the housing 8. In this way, it is ensured that the whole cooling mass flow is recorded, in particular when the partial paths 92b, 92c, 92e are present, because the whole cooling mass flow which is branched off downstream from the heat exchanger 93 also contributes to the bypass function of the drive cooling path 92.

It is possible for the respective desired bypass mass flow or target bypass mass flow to have been determined experimentally for different operating states or operating points of the fuel cell system 1 and stored in a map in the regulation unit 100. It ensures that compressor surge is prevented for the respective operating state. The throttling characteristics of the drive cooling path 92 are thus adapted according to the operating state or operating point B of the fuel cell system 1.

The regulation unit 100 determines the target bypass mass flow with the aid of the map, depending on the current operating state or operating point B of the fuel cell system 1, and adjusts the actual value for the cooling mass flow to the target bypass mass flow. The control variable is the degree of opening of the cooling valve 95.

The regulation unit 100 thus performs both a temperature regulation and regulation of the bypass mass flow.

Because it is intended that the regulation unit 100 primarily ensures the required cooling of the drive device 20 and the components of the turbomachine 10, the cooling mass flow which results owing to the set degree of opening of the cooling valve 95 will be at least large enough to enable the target temperature at the outlet 125 of the cooling mass flow to be met as far as possible. Owing to the higher-level regulation of the bypass mass flow, a resulting cooling mass flow can be set in the drive cooling path 92 which is greater than the mass flow required to set the target value for the temperature of the medium at the outlet of the drive cooling path 92. Either the mass flow required for setting the target temperature or, if the target bypass mass flow is greater, the target bypass mass flow is set. In this way, it is ensured that the compressor surge is prevented in addition to setting the required cooling effect. The mass flow set via the cooling valve 95 ensures that both the target temperature and the bypass mass flow which is desired to prevent the compressor surge are set for the purpose of pressure limitation.

The regulation unit 100 can moreover recognize, with the aid of the received operating state or operating point B of the fuel cell system 1, whether the fuel cell system 1 is in an operating state in which it is to be prevented that working fluid flows through the fuel cell 2. In this case too, the regulation unit 100 activates the cooling valve 95 in order to set a degree of opening which causes a cooling mass flow which may exceed the resulting cooling mass flow for setting the target temperature for the required cooling of the drive device 20. In this way, it is ensured that working fluid is prevented from flowing through the fuel cell 2 in addition to the required cooling effect being set. This can be effected, for example, by completely opening the cooling valve 95. Such an operating state exists, for example, when the functioning of the compressor 11 for supplying air to the fuel cell system 1 needs to be tested. It is thus a matter of checking whether sufficient pressure and mass flow can be supplied by the compressor 11. The flow of working fluid through the fuel cell 2 should thus also be prevented in order to protect the fuel cell 2 in the event of possible malfunction of the compressor 11. This can be achieved by completely opening the cooling valve 95. In this case too, the mass flow set via the cooling valve 95 ensures that both the target temperature and the bypass mass flow or target bypass mass flow which is desired for the existing operating state or operating point B of the fuel cell system 1 are set.

Owing to the drive cooling path 92, the fuel cell 2 through which all of the working fluid normally passes is bypassed somewhat or completely because some of the working fluid is branched off downstream from the compressor 11, before it enters the fuel cell 2. As described, the compressor 11 can thus be operated in at least one operating state without delivering working fluid through the fuel cell 2.

Figure 5:
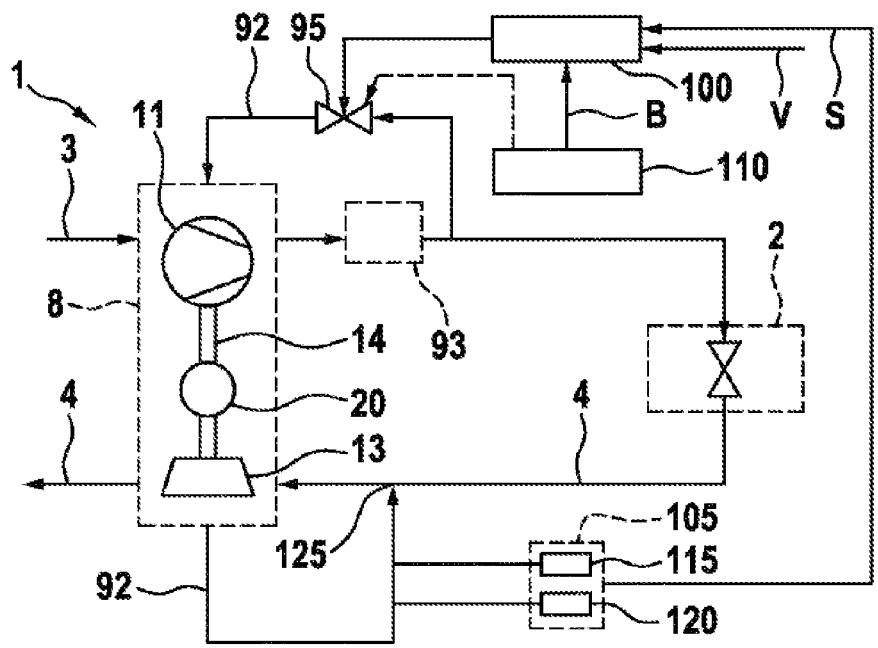
FIG. 5 shows schematically a fuel cell system with a turbomachine according to a second exemplary embodiment which takes the form of a turbocompressor.
Figure 6:
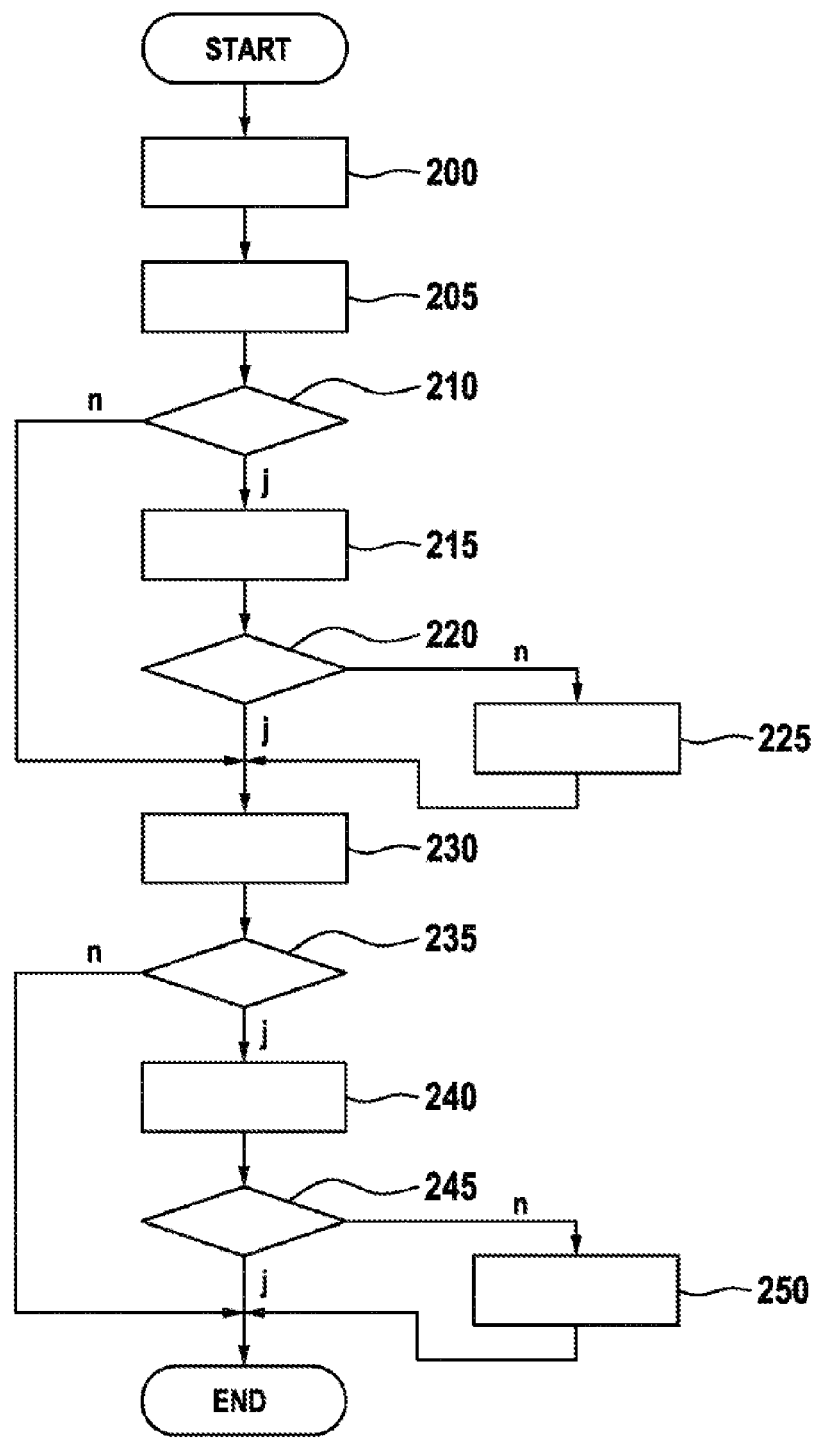
FIG. 6 shows a flow chart for a method according to the invention for operating the turbomachine or the fuel cell system.

A flow chart is shown in FIG. 5 for an exemplary sequence of the described method according to the invention for operating the turbomachine 10 or the fuel cell system 1 with respect to setting the target temperature at the outlet 125 of the drive cooling path 92 and the target bypass mass flow. The method takes place in the regulation unit 100.

After the program has started, the current operating state or operating point B of the fuel cell system 1 is determined at a program point 200. The sequence then branches to a program point 205.

At program point 205, the actual temperature at the outlet 125 of the drive cooling path 92 is received by the regulation unit 100, with the aid of the sensor signals S, and compared with the target temperature. The degree of opening of the cooling valve 95 is set depending on the difference between the target temperature and the actual temperature in order to adjust the actual temperature to the target temperature. The sequence then branches to a program point 210.

At program point 210, a check is made whether the determined operating state B requires a reduction in the mass flow of the working fluid through the fuel cell 2 or even interrupting this mass flow, for example for the described functional test of the compressor 11. If this is the case, the sequence branches to a program point 215; if not, it branches to a program point 230.

At program point 215, a first target bypass mass flow is determined in order to effect the required reduction in the mass flow through the fuel cell 2. The sequence then branches to a program point 220.

At program point 220, the actual value for the cooling mass flow is received by the regulation unit 100, with the aid of the sensor signals S, and compared with the determined first target bypass mass flow and a check is made whether the first target bypass mass flow is less than the actual value for the cooling mass flow. If this is the case, the sequence branches to program point 230 and the activation of the cooling valve 95 is maintained unchanged; if not, it branches to a program point 225.

At program point 225, the degree of opening of the cooling valve 95 is increased in order to adjust the actual value for the cooling mass flow to the first target bypass mass flow. In the example of the functional test of the compressor 11, the cooling valve 95 is completely opened. The sequence then branches to program point 230.

At program point 230, the further sensor signals V are evaluated for the presence of compressor surge. The sequence then branches to a program point 235.

At program point 235, a check is made whether there is compressor surge. If this is the case, the sequence branches to program point 240; if not, the program is exited and rerun for the continuing operation of the fuel cell system 1.

At program point 240, a second target bypass mass flow is determined, for example, as described from a map, in which the compressor surge is prevented with a sufficient gap from the surge limit in a so-called safety mode. In this case, operation close to the surge limit is preferably not set for safety reasons. The sequence then branches to a program point 245.

At program point 245, the actual value for the cooling mass flow is received by the regulation unit 100, with the aid of the sensor signals S, and compared with the determined second target bypass mass flow and a check is made whether the second target bypass mass flow is less than the actual value for the cooling mass flow. If this is the case, the program is exited and the activation of the cooling valve 95 maintained unchanged. The sequence then branches to a program point 250.

At program point 250, the degree of opening of the cooling valve 95 is increased in order to adjust the actual value for the cooling mass flow to the second target bypass mass flow. The program is then exited.

Where it is intended not to omit the separate bypass duct 150 with the bypass valve 5, only the described map-based control or temperature regulation come into consideration for the activation of the cooling valve 95, and in the flow chart in FIG. 5 the program would be exited after program step 205 and then rerun for the continuing operation of the fuel cell system 1.

According to a second exemplary embodiment of the fuel cell system 1 in FIG. 5, wherein the same reference symbols designate the same elements as in the preceding drawings, in contrast to the first exemplary embodiment of the fuel cell system 1 in FIG. 4, after leaving the housing 8, the drive cooling path 92 opens into the exhaust gas line 4 upstream from the exhaust gas turbine 13 rather than downstream. As a result, the cooling mass flow is fed back to the exhaust gas turbine 13 such that recovery of the residual energy of the cooling mass flow is enabled. As a result, compared with the first exemplary embodiment in FIG. 4, however, only lower pressure drops and mass flows via the drive cooling path 92 are possible.

The invention claimed is:

1. A turbomachine (10), comprising a compressor (11), a drive device (20), and a shaft (14), wherein the compressor (11) has an impeller (15) arranged on the shaft (14), a compressor inlet (11a), and a compressor outlet (11b), wherein the compressor (11) is configured to deliver a working fluid from the compressor inlet (11a) to the compressor outlet (11b), characterized in that a drive cooling path (92) branches off at the compressor outlet (11b) in order to cool the drive device (20),
   wherein a cooling valve (95) is arranged in the drive cooling path (92),
   wherein a regulation unit (100) is provided which controls the degree of opening of the cooling valve (95) in order to adjust an actual value of the temperature of the medium in the drive cooling path (92) to a target value of the temperature, and
   wherein the regulation unit (100) controls the degree of opening of the cooling valve (95) depending on the target value of the temperature of the medium in the drive cooling path (92) and depending on a desired bypass mass flow.

2. The turbomachine (10) as claimed in claim 1, characterized in that a heat exchanger (93) is arranged in the drive cooling path (92) upstream from the drive device (20).

3. The turbomachine (10) as claimed in claim 1, characterized in that the drive device (20) has a rotor (21) and a stator (22), wherein the rotor (21) is arranged on the shaft (14), wherein the drive cooling path (92) leads through a gap between the rotor (21) and the stator (22).

4. The turbomachine (10) as claimed in claim 1, characterized in that the impeller (15) takes the form of a radial rotor, wherein the working fluid can flow through the impeller (15) on its front side (15a), along a flow path (16), wherein the flow path (16) comprises an axial flow end (18) and a radial flow end (17).

5. The fuel cell system (1) as claimed in claim 1, wherein the fuel cell system (1) has an exhaust gas turbine (13) with a further impeller (13a), wherein the further impeller (13a) is arranged on the shaft (14), wherein the exhaust gas turbine (13) is arranged in the exhaust gas line (4).

6. The turbomachine (10) as claimed in claim 1, characterized in that that a bypass duct (92) for pressure limitation branches off at the compressor outlet (11b).

7. The turbomachine (10) as claimed in claim 1, characterized in that the regulation unit (100) controls the degree of opening of the cooling valve (95) in order to adjust an actual value of the temperature of the medium in the drive cooling path (92) in the region of the downstream end of the drive cooling path (92) to the target value of the temperature.

8. The turbomachine (10) as claimed in claim 1, characterized in that the shaft (14) is mounted by means of an axial bearing (43) and at least one radial bearing (41, 42), wherein the drive cooling path (92) branches into a first partial path (92b) and a second partial path (92c), wherein the axial bearing (43) is arranged in the first partial path (92b) and the radial bearing (41, 42) in the second partial path (92c).

9. The turbomachine (10) as claimed in claim 8, characterized in that a partial path valve (96) is arranged in the first partial path (92b) downstream from the axial bearing (43).

10. The turbomachine (10) as claimed in claim 1, characterized in that, arranged opposite the rear side (15b) of the impeller (15) is a rear wall (89) as part of a housing (8) of the turbomachine (10), wherein ventilation bores (88) are formed in the rear wall (89), wherein the ventilation bores (88) are arranged in an impeller rear cooling path (91) of the turbomachine (10) which branches off from the compressor outlet (11b).

11. The turbomachine (10) as claimed in claim 10, characterized in that the shaft (14) is mounted by means of an axial bearing (43), wherein the impeller rear cooling path (91) passes through the axial bearing (43).

12. The turbomachine (10) as claimed in claim 10, characterized in that the shaft (14) is mounted by means of two radial bearings (41, 42), wherein the drive cooling path (92) branches into a first partial path (92b) and into a second partial path (92c), wherein one radial bearing (41) is arranged in the first partial path (92b) and one radial bearing (42) in the second partial path (92c), wherein the impeller rear cooling path (91) opens into the first partial path (92b).

13. A method for operating a turbomachine (10) as claimed in claim 1, characterized in that the degree of opening of the cooling valve (95) is controlled by the regulation unit (100) in order to set the predetermined target value for the temperature of the medium in the drive cooling path (92).

14. The method as claimed in claim 13, characterized in that the degree of opening of the cooling valve (95) is controlled by the regulation unit (100) in order to set, depending on a detected compressor surge, a desired bypass mass flow in the drive cooling path (92) which is greater than the mass flow required to set the target value for the temperature of the medium in the drive cooling path (92).

15. The turbomachine (10) as claimed in claim 1, characterized in that the shaft (14) is mounted by means of two radial bearings (41, 42), the two radial bearings (41, 42) being arranged in the drive cooling path (92).

16. The turbomachine (10) as claimed in claim 15, characterized in that the drive cooling path (92) branches into a first partial path (92*b*) and into a second partial path (92*c*), wherein one of the radial bearings (41) is arranged in the first partial path (92*b*) and an other of the radial bearings (42) is arranged in the second partial path (92*c*).

17. The turbomachine (10) as claimed in claim 16, characterized in that a partial path valve (96) is arranged in the first partial path (92*b*).

18. The turbomachine (10) as claimed in claim 16, characterized in that the cooling valve (95) is arranged in the drive cooling path (92) upstream from the two partial paths (92*b*, 92*c*).

19. The turbomachine (10) as claimed in claim 16, characterized in that the shaft (14) is mounted by means of an axial bearing (43), wherein the axial bearing (43) is arranged in the first partial path (92*b*).

20. The turbomachine (10) as claimed in claim 19, characterized in that a partial path valve (96) is arranged in the first partial path (92*b*) downstream from the axial bearing (43).

21. The turbomachine (10) as claimed in claim 1, characterized in that a bypass duct (92) branches off at the compressor outlet (11*b*).

22. The turbomachine (10) as claimed in claim 21, characterized in that the bypass duct is formed by the drive cooling path (92).

23. The turbomachine (10) as claimed in claim 21, characterized in that a bypass valve (95) is arranged in the bypass duct (92).

24. The turbomachine (10) as claimed in claim 23, characterized in that the bypass valve is formed by the cooling valve (95).

25. A fuel cell system (1) with a fuel cell (2), an air feed line (3) for feeding an oxidizing agent into the fuel cell (2), and an exhaust gas line (4) for discharging the oxidizing agent from the fuel cell (2), characterized in that the fuel cell system (1) has a turbomachine (10) as claimed in claim 1, wherein the compressor (11) is arranged in the air feed line (3).

26. The fuel cell system (1) as claimed in claim 25, characterized in that the drive cooling path (92) opens into the exhaust gas line (4) upstream from the exhaust gas turbine (13).

27. The fuel cell system (1) as claimed in claim 25, characterized in that the drive cooling path (92) opens into the exhaust gas line (4) downstream from the exhaust gas turbine (13).

28. A method for operating a fuel cell system (1) with a turbomachine (10) as claimed in claim 1, a fuel cell (2), an air feed line (3) for feeding an oxidizing agent into the fuel cell (2), and an exhaust gas line (4) for discharging the oxidizing agent from the fuel cell (2), wherein the compressor (11) is arranged in the air feed line (3), wherein the degree of opening of the cooling valve (95) is controlled by the regulation unit (100) in order to set, depending on a desired operating state of the fuel cell system (1), a desired bypass mass flow in the drive cooling path (92) which is greater than the mass flow required to set the target value for the temperature of the medium in the drive cooling path.

\* \* \* \* \*